United States Patent
Yamamoto et al.

(10) Patent No.: US 7,274,519 B2
(45) Date of Patent: Sep. 25, 2007

(54) ZOOM LENS SYSTEM

(75) Inventors: Hiroshi Yamamoto, Kawasaki (JP); Keiko Mizuguchi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/390,282

(22) Filed: Mar. 28, 2006

(65) Prior Publication Data

US 2006/0245079 A1 Nov. 2, 2006

(30) Foreign Application Priority Data

Mar. 30, 2005 (JP) ............................. 2005-098693

(51) Int. Cl.
*G02B 9/14* (2006.01)
(52) U.S. Cl. .................. 359/785; 359/690; 359/784
(58) Field of Classification Search ............... 359/690, 359/689, 687, 686, 785, 784, 683, 684
See application file for complete search history.

(56) References Cited

U.S. PATENT DOCUMENTS

| | | | |
|---|---|---|---|
| 4,840,469 A | 6/1989 | Moriyama | 350/427 |
| 4,871,241 A | 10/1989 | Matsuo | 350/427 |
| 5,061,053 A | 10/1991 | Hirakawa | 359/690 |
| 5,347,399 A | 9/1994 | Yoneyama et al. | 359/690 |
| 5,530,594 A | 6/1996 | Shibayama | 359/690 |
| 5,654,826 A | 8/1997 | Suzuki | |
| 5,731,897 A | 3/1998 | Suzuki | |
| 6,052,235 A * | 4/2000 | Ozaki | 359/686 |
| 6,259,508 B1 * | 7/2001 | Shigematsu | 355/53 |
| 6,404,561 B1 * | 6/2002 | Isono et al. | 359/683 |
| 6,483,649 B2 | 11/2002 | Ozaki | 359/690 |
| 6,693,750 B2 | 2/2004 | Sato | |
| 6,778,329 B2 | 8/2004 | Ozaki | |
| 7,123,422 B2 * | 10/2006 | Suzuki | 359/690 |
| 2005/0219708 A1 | 10/2005 | Shibayama | |

FOREIGN PATENT DOCUMENTS

| | | |
|---|---|---|
| JP | 63-118117 | 5/1988 |
| JP | 63-194216 | 8/1988 |
| JP | 5-303034 | 11/1993 |
| JP | 7-63993 | 3/1995 |
| JP | 8-20601 | 3/1996 |
| JP | 2691563 | 9/1997 |
| JP | 2001-13410 | 1/2001 |
| JP | 2001-188169 | 7/2001 |
| JP | 2005-266183 | 9/2005 |

* cited by examiner

*Primary Examiner*—Timothy Thompson
(74) *Attorney, Agent, or Firm*—Miles & Stockbridge PC

(57) ABSTRACT

Providing a compact zoom lens system having a high zoom ratio. The zoom lens system includes, in order from an object, a first lens group G1 having positive refractive power, a second lens group G2 having negative refractive power, and a third lens group G3 having positive refractive power. When a state of lens group positions varies from a wide-angle end state W to a telephoto end state T, at least the first lens group G1 and the third lens group G3 are moved along the optical axis to the object. Given conditional expressions are satisfied.

18 Claims, 10 Drawing Sheets

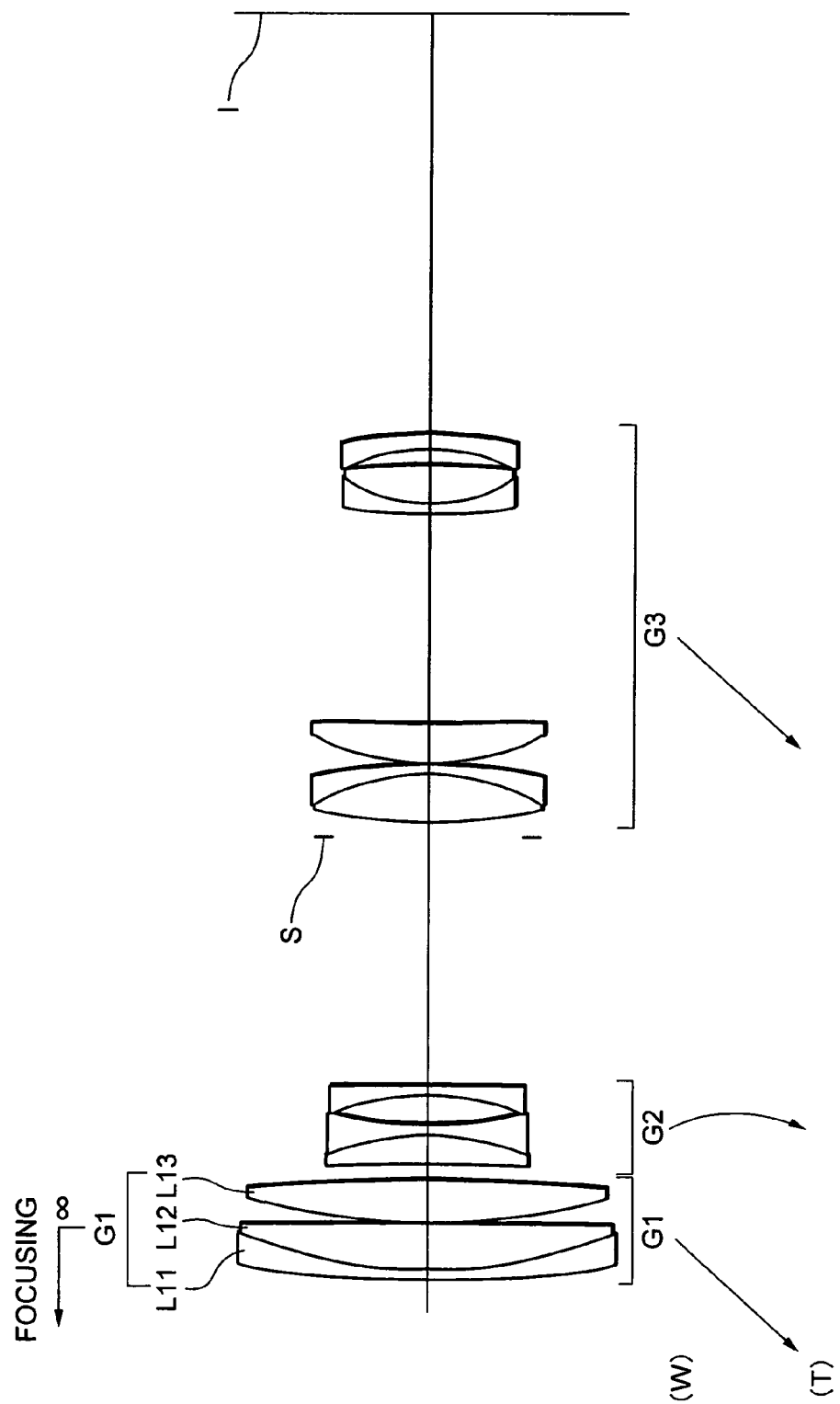

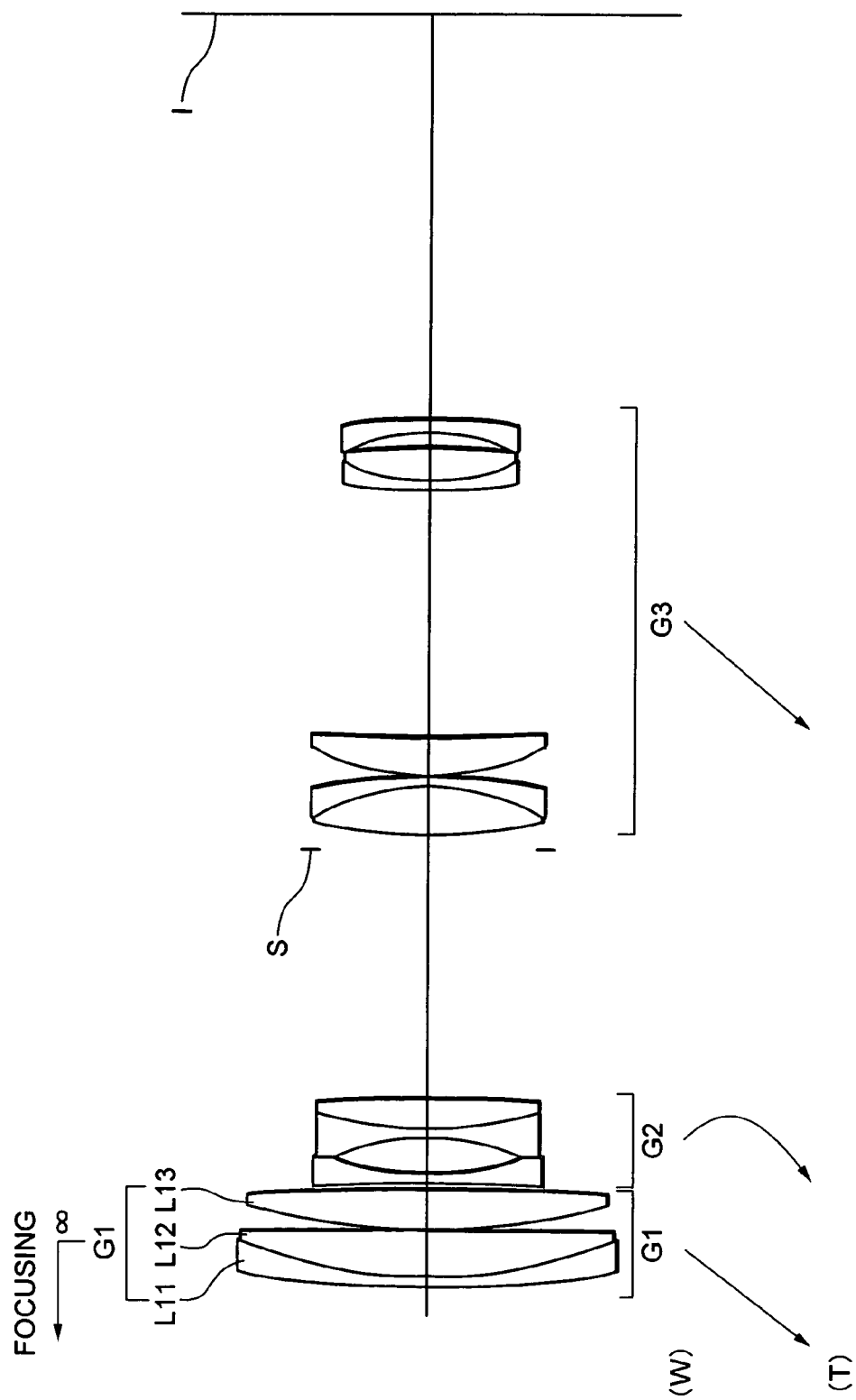

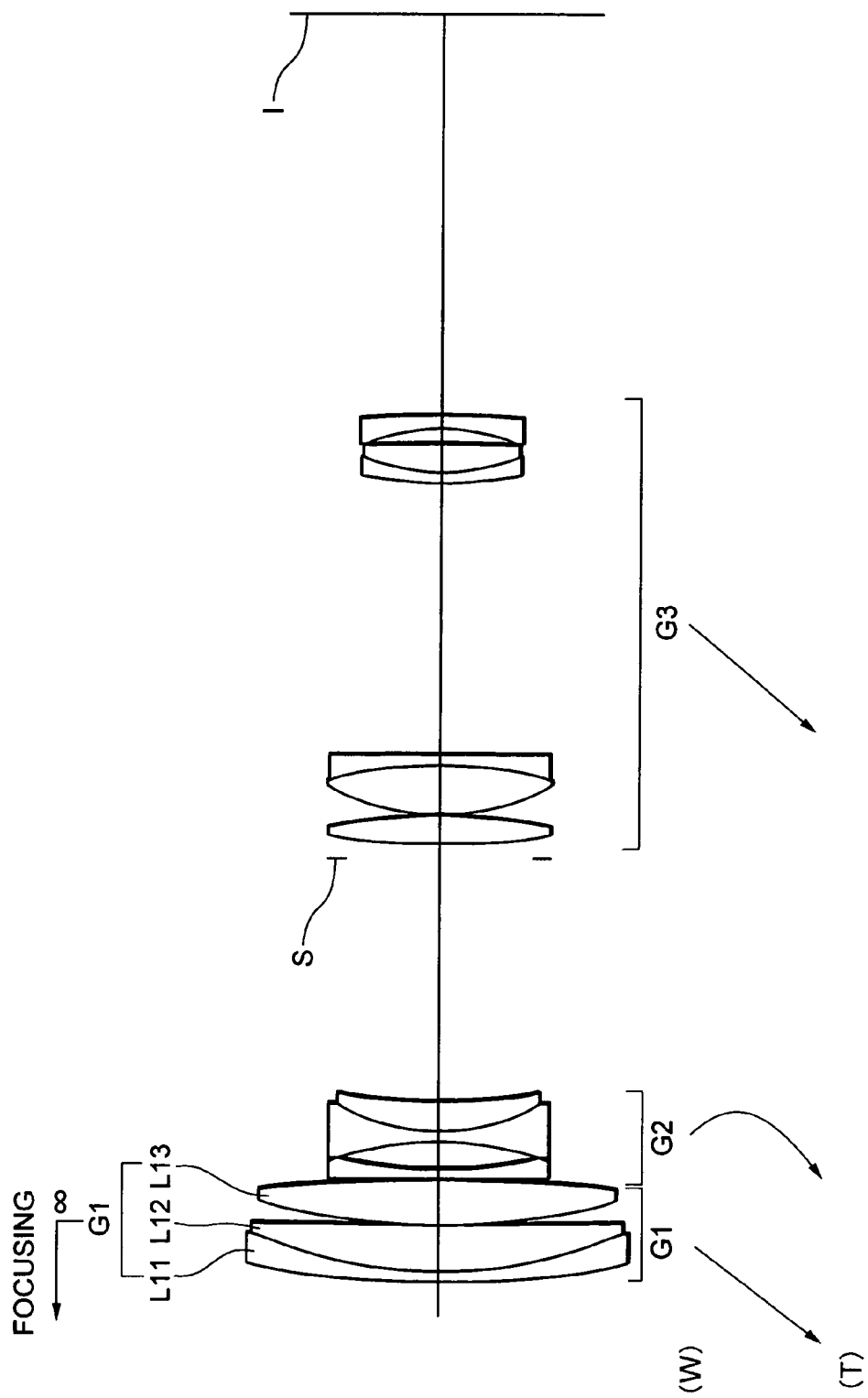

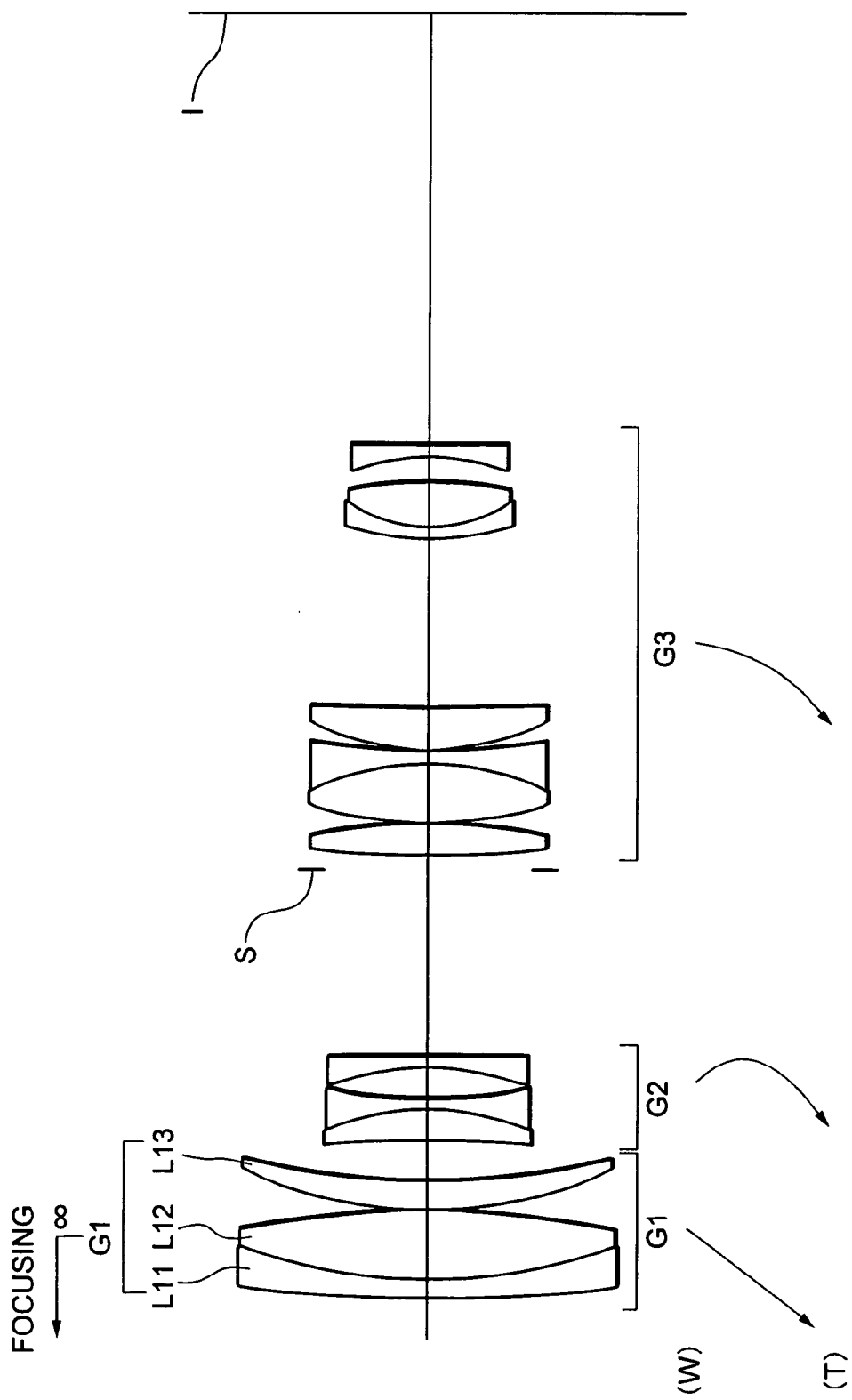

ZOOM LENS SYSTEM

The disclosure of the following priority application is herein incorporated by reference:

Japanese Patent Application No. 2005-098693 filed on Mar. 30, 2005.

BACKGROUND OF THE INVENTION

1. Field of the Invention

The present invention relates to a zoom lens system suitable for a single-lens reflex camera, a digital camera, and the like.

2. Related Background Art

A zoom lens system has been proposed that is a three-lens-group zoom lens system with positive-negative-positive power distribution suitable for a single-lens reflex camera, a digital camera, and the like (see, for example, Japanese Examined Patent Application Publication No. 8-20601 and Japanese Patent No. 2691563).

However, each of the zoom lens systems disclosed in Japanese Examined Patent Application Publication No. 8-20601 and Japanese Patent No. 2691563 has a zoom ratio of only about two to three, and the total lens length thereof is fairly long, so that it can be hardly said that the zoom lens system is small and compact.

SUMMARY OF THE INVENTION

The present invention is made in view of the aforementioned problems and has an object to provide a compact zoom lens system with increasing the zoom ratio to about 3.5 in comparison with that of a conventional one.

According to a first aspect of the present invention, there is provided a zoom lens system including, in order from an object, a first lens group having positive refractive power, a second lens group having negative refractive power, and a third lens group having positive refractive power. When a state of lens group positions varies from a wide-angle end state to a telephoto end state, at least the first lens group and the third lens group are moved along the optical axis to the object. The following conditional expression (1) is satisfied:

$$1.58 < f1/fw < 2.80 \quad (1)$$

where f1 denotes a focal length of the first-lens group, and fw denotes a focal length of the zoom lens system in the wide-angle end state.

In the first aspect of the present invention, it is preferable that when a state of lens group positions varies from the wide-angle end state to the telephoto end state, a distance between the first lens group and the second lens group increases, and a distance between the second lens group and the third lens group decreases.

In the first aspect of the present invention, the following conditional expression (2) is preferably satisfied:

$$0.00 < |X2/X1| < 0.15 \quad (2)$$

where X1 denotes a moving amount of the first lens group upon zooming from the wide-angle end state to the telephoto end state, and X2 denotes a moving amount of the second lens group upon zooming from the wide-angle end state to the telephoto end state.

In the first aspect of the present invention, the following conditional expression (3) is preferably satisfied:

$$0.021 < Z/TL < 0.050 \quad (3) \text{ [unit: 1/mm]}$$

where TL denotes a distance between the most object side surface of the zoom lens system in the wide-angle end state and an image plane, and Z denotes a zoom ratio.

In the first aspect of the present invention, focusing from infinity to a close object is preferably carried out by moving the first lens group along the optical axis to the object.

In the first aspect of the present invention, the following conditional expression (4) is preferably satisfied:

$$3.0 < |X3/Z| < 9.5 \quad (4) \text{ [unit: mm]}$$

where X3 denotes a moving amount of the third lens group upon zooming from the wide-angle end state to the telephoto end state, and Z denotes a zoom ratio.

In the first aspect of the present invention, it is preferable that the first lens group is composed of, in order from the object, a cemented positive lens constructed by a negative meniscus lens cemented with a positive lens, and a single positive lens having positive refractive power.

In the first aspect of the present invention, the following conditional expression (5) is preferably satisfied:

$$65 < (\nu 2 + \nu 3)/2 < 83 \quad (5)$$

where $\nu 2$ denotes Abbe number of the positive lens in the cemented lens at d-line (wavelength $\lambda = 587.6$ nm), and $\nu 3$ denotes Abbe number of the single positive lens at d-line (wavelength $\lambda = 587.6$ nm).

In the first aspect of the present invention, the single positive lens having positive refractive power preferably has a meniscus shape, and the following conditional expression (6) is preferably satisfied:

$$2.0 < (r2+r1)/(r2-r1) < 5.0 \quad (6) \text{ [unit: mm]}$$

where r1 denotes a radius of curvature of the object side surface of the single positive lens, and r2 denotes a radius of curvature of the image side surface of the single positive lens.

In the first aspect of the present invention, an aperture stop is preferably disposed in the vicinity of or in the third lens group.

In the first aspect of the present invention, every lens surface is a spherical surface.

According to a second aspect of the present invention, there is provided a method for forming an image of an object and varying a focal length of a zoom lens system that includes, in order from the object, a first lens group having positive refractive power, a second lens group having negative refractive power, and a third lens group having positive refractive power. The method includes steps of, varying the focal length of the zoom lens system from a wide-angle end state to a telephoto end state by moving at least the first lens group and the third lens group to the object along the optical axis, and satisfying the following conditional expression (1):

$$1.58 < f1/fw < 2.80 \quad (1)$$

where f1 denotes a focal length of the first lens group, and fw denotes a focal length of the zoom lens system in the wide-angle end state.

In the second aspect of the present invention, it is preferable that the method further includes the step of varying the focal length from the wide-angle end state to the telephoto end state by increasing a distance between the first lens group and the second lens group and decreasing a distance between the second lens group and the third lens group.

In the second aspect of the present invention, it is preferable that the method further includes the step of satisfying the following conditional expression (2):

$$0.00 < |X2/X1| < 0.15 \quad (2)$$

where X1 denotes a moving amount of the first lens group upon zooming from the wide-angle end state to the telephoto end state, and X2 denotes a moving amount of the second lens group upon zooming from the wide-angle end state to the telephoto end state.

In the second aspect of the present invention, it is preferable that the method further includes the step of satisfying the following conditional expression (3):

$$0.021 < Z/TL < 0.050 \quad (3) \text{ [unit: 1/mm]}$$

where TL denotes a distance between the most object side surface of the zoom lens system in the wide-angle end state and an image plane, and Z denotes a zoom ratio.

In the second aspect of the present invention, it is preferable that the method further includes the step of carrying out focusing from infinity to a close object by moving the first lens group to the object along the optical axis.

In the second aspect of the present invention, it is preferable that the method further includes the step of satisfying the following conditional expression (4):

$$3.0 < |X3/Z| < 9.5 \quad (4) \text{ [unit: mm]}$$

where X3 denotes a moving amount of the third lens group upon zooming from the wide-angle end state to the telephoto end state, and Z denotes a zoom ratio.

Other features and advantages according to the present invention will be readily understood from the detailed description of the preferred embodiments in conjunction with the accompanying drawings.

BRIEF DESCRIPTION OF THE DRAWINGS

FIG. 1 is a diagram showing a lens configuration of a zoom lens system according to Example 1 of the present invention.

FIGS. 2A, 2B and 2C are graphs showing various aberrations of the zoom lens system according to Example 1 in which FIG. 2A shows various aberrations in a wide-angle end state, FIG. 2B shows various aberrations in an intermediate focal length state, and FIG. 2C shows various aberrations in a telephoto end state.

FIG. 3 is a diagram showing a lens configuration of a zoom lens system according to Example 2 of the present invention.

FIGS. 4A, 4B and 4C are graphs showing various aberrations of the zoom lens system according to Example 2 in which FIG. 4A shows various aberrations in a wide-angle end state, FIG. 4B shows various aberrations in an intermediate focal length state, and FIG. 4C shows various aberrations in a telephoto end state.

FIG. 5 is a diagram showing a lens configuration of a zoom lens system according to Example 3 of the present invention.

FIGS. 6A, 6B and 6C are graphs showing various aberrations of the zoom lens system according to Example 3 in which FIG. 6A shows various aberrations in a wide-angle end state, FIG. 6B shows various aberrations in an intermediate focal length state, and FIG. 6C shows various aberrations in a telephoto end state.

FIGS. 8A, 8B and 8C are graphs showing various aberrations of the zoom lens system according to Example 4 in which FIG. 8A shows various aberrations in a wide-angle end state, FIG. 8B shows various aberrations in an intermediate focal length state, and FIG. 8C shows various aberrations in a telephoto end state.

FIG. 9 is a diagram showing a lens configuration of a zoom lens system according to Example 5 of the present invention.

FIGS. 10A, 10B and 10C are graphs showing various aberrations of the zoom lens system according to Example 5 in which FIG. 10A shows various aberrations in a wide-angle end state, FIG. 10B shows various aberrations in an intermediate focal length state, and FIG. 10C shows various aberrations in a telephoto end state.

DESCRIPTION OF THE MOST PREFERRED EMBODIMENTS

Figure 2A:
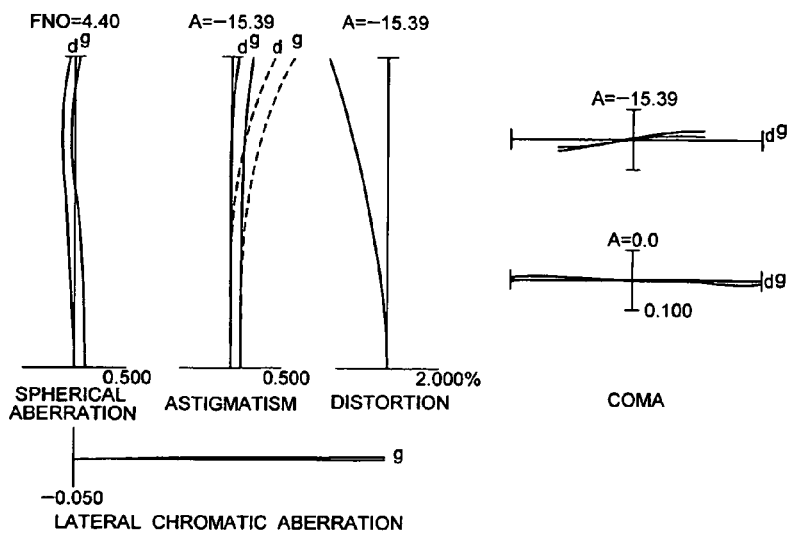

Examples according to the present invention are explained below in detail with reference to accompanying drawings.

A zoom lens system according to the present invention is composed of, in order from an object, a first lens group having positive refractive power, a second lens group having negative refractive power, a third lens group having positive refractive power. When a state of lens group positions varies from a wide-angle end state to a telephoto end state, the first lens group and the third lens group are moved to the object, and the second lens group is moved at first to an image and then to the object such that a distance between the first lens group and the second lens group increases, and a distance between the second lens group and the third lens group decreases. The movement of the third lens group may be either linear or non-linear.

In the zoom lens system according to the present invention, the following conditional expression (1) is satisfied:

$$1.58 < f1/fw < 2.80 \quad (1)$$

where f1 denotes a focal length of the first lens group, and fw denotes a focal length of the zoom lens system in the wide-angle end state.

Conditional expression (1) relates to making the total lens length compact and defines an appropriate range of the focal length f1 of the first lens group. When the ratio f1/fw is equal to or exceeds the upper limit of conditional expression (1), the focal length of the first lens group becomes large, and the total lens length of the zoom lens system becomes large, which is against the object of the present invention. Accordingly, it is undesirable. On the other hand, when the ratio f1/fw is equal to or falls below the lower limit of conditional expression (1), the focal length of the first lens group becomes small. Accordingly, the back focal length becomes short in accordance with the focal length of the first lens group, an available range of the distance between the first lens group and the second lens group becomes narrow, so that it becomes difficult to obtain a high zoom ratio. In addition, it becomes difficult to correct various aberrations including spherical aberration and astigmatism with good balance. In order to secure the effect of the present invention, it is preferable to set the upper limit of conditional expression (1) to 2.3. In order to secure the effect of the present invention, it is preferable to set the lower limit of conditional expression (1) to 1.6.

In the zoom lens system according to the present invention, when a state of lens group positions varies from the wide-angle end state to the telephoto end state, the distance between the first lens group and the second lens group increases, and the distance between the second lens group and the third lens group decreases, and the following conditional expression (2) is preferably satisfied:

$$0.00 < |X2/X1| < 0.15 \quad (2)$$

where X1 denotes a moving amount of the first lens group upon zooming from the wide-angle end state to the telephoto end state, and X2 denotes a moving amount of the second lens group upon zooming from the wide-angle end state to the telephoto end state.

Here, the moving amount X1 upon zooming means a difference in the position of the first lens group along the optical axis between the wide-angle end state and the telephoto end state. Assuming that the origin is a position of the first lens group in the wide-angle end state, the sign is positive when the position of the first lens group on the optical axis in the telephoto end state is disposed to the object side of the origin, and the sign is negative when the position is disposed to the image side of the origin. The moving amount X2 of the second lens group upon zooming means a difference in the position of the second lens group along the optical axis between the wide-angle end state and the telephoto end state. The sign is similar to the case of the moving amount X1 upon zooming.

Conditional expression (2) defines an appropriate range of the ratio of the moving amount of the second lens group to that of the first lens group upon zooming. When the absolute value of the ratio |X2/X1| is equal to or exceeds the upper limit of conditional expression (2), the moving amount of the second lens group becomes too large to correct variations in various aberrations upon zooming, so that it is undesirable. On the other hand, when the absolute value of the ratio |X2/X1| is equal to or falls below the lower limit of conditional expression (2), since the zooming becomes highly depending on the first lens group, the moving amount of the first lens group becomes too large, so that it becomes difficult to compose the lens barrel. In order to secure the effect of the present invention, it is preferable to set the upper limit of conditional expression (2) to 0.1. In order to secure the effect of the present invention, it is preferable to set the lower limit of conditional expression (2) to 0.01.

In the zoom lens system according to the present invention, the following conditional expression (3) is preferably satisfied:

$$0.021 < Z/TL < 0.050 \quad (3) \text{ [unit: 1/mm]}$$

where TL denotes a distance between the most object side lens surface and the image plane of the zoom lens system in the wide-angle end state, and Z denotes a zoom ratio.

Conditional expression (3) defines an appropriate range of the relation between the zoom ratio and the total lens length. When the ratio Z/TL is equal to or exceeds the upper limit of conditional expression (3), the total lens length becomes too short to correct various aberrations, so that it is undesirable. On the other hand, when the ratio Z/TL is equal to or falls below the lower limit of conditional expression (3), the total lens length becomes large, and it becomes impossible to accomplish a small, compact zoom lens system with the zoom ratio of about four. In order to secure the effect of the present invention, it is preferable to set the upper limit of conditional expression (3) to 0.035. In order to secure the effect of the present invention, it is preferable to set the lower limit of conditional expression (3) to 0.025.

In the zoom lens system according to the present invention, it is preferable that focusing from infinity to a close object is carried out by moving the first lens group along the optical axis to the object side. With this configuration, preferable optical performance can be obtained over entire zooming range. Incidentally, it is possible to compose the zoom lens system such that focusing is carried out by moving a lens group other than the first lens group.

In the zoom lens system according to the present invention, the following conditional expression (4) is preferably satisfied:

$$3.0 < |X3/Z| < 9.5 \quad (4) \text{ [unit: mm]}$$

where X3 denotes a moving amount of the third lens group upon zooming which is a difference in the position of the third lens group along the optical axis between the wide-angle end state and the telephoto end state. The sign is the same as the case of the moving amount X1 upon zooming.

Conditional expression (4) defines an appropriate range of the relation between the moving amount of the third lens group upon zooming and the zoom ratio. When the value |X3/Z| is equal to or exceeds the upper limit of conditional expression (4), the moving amount of the third lens group becomes too large to correct variations in aberrations upon zooming, and it becomes difficult to make the total lens length of the zoom lens system compact. On the other hand, when the value |X3/Z| is equal to or falls below the lower limit of conditional expression (4), since refractive power of the third lens group has to be strong, it becomes difficult to correct variations in aberrations upon zooming. In order to secure the effect of the present invention, it is preferable to set the upper limit of conditional expression (4) to 8.0. In order to secure the effect of the present invention, it is preferable to set the lower limit of conditional expression (4) to 4.0.

In the zoom lens system according to the present invention, it is preferable that the first lens group is composed of, in order from the object, a cemented positive lens constructed by a negative meniscus lens cemented with a positive lens, and a single positive lens having positive refractive power. The following conditional expression (5) is preferably satisfied:

$$65 < (\nu 2 + \nu 3)/2 < 83 \quad (5)$$

where $\nu 2$ denotes Abbe number of the positive lens in the cemented lens at d-line (wavelength $\lambda = 587.6$ nm), and $\nu 3$ denotes Abbe number of the single positive lens at d-line (wavelength $\lambda = 587.6$ nm).

Conditional expression (5) defines an appropriate range of an average value of Abbe numbers of the positive lenses in the first lens group. In an optical system with an object to be compact, lateral chromatic aberration in the telephoto side tends to become large. Accordingly, it becomes possible to preferably correct lateral chromatic aberration by selecting glass materials satisfying conditional expression (5). In addition, it is preferable that at least one of the two positive lenses in the first lens group, which are the positive lens in the cemented lens and the single positive lens, is made of a glass material with anomalous dispersion. In order to secure the effect of the present invention, it is preferable to set the upper limit of conditional expression (5) to 80. In order to secure the effect of the present invention, it is preferable to set the lower limit of conditional expression (5) to 70.

In the zoom lens system according to the present invention, it is preferable that the single positive lens having positive refractive power in the first lens group has a meniscus shape, and the following conditional expression (6) is preferably satisfied:

$$2.0 < (r2+r1)/(r2-r1) < 5.0 \qquad (6) \text{ [unit: mm]}$$

where r1 denotes a radius of curvature of the object side surface of the single positive lens, and r2 denotes a radius of curvature of the image side surface of the single positive lens in the first lens group.

Conditional expression (6) defines the meniscus shape of the single positive lens having positive refractive power in the first lens group. When the ratio (r2+r1)/(r2−r1) is equal to, or either exceeds the upper limit of conditional expression (6) or falls below the lower limit of conditional expression (6), it becomes difficult to correct various aberrations including spherical aberration and astigmatism in the telephoto end state with keeping good balance. In order to secure the effect of the present invention, it is preferable to set the upper limit of conditional expression (6) to 3.9. In order to secure the effect of the present invention, it is preferable to set the lower limit of conditional expression (6) to 2.5.

Zoom lens systems according to respective Examples of the present invention are explained with reference to accompanying drawings.

EXAMPLE 1

FIG. 1 is a diagram showing a lens configuration of a zoom lens system according to Example 1 of the present invention.

In FIG. 1, a zoom lens system according to Example 1 of the present invention is composed of, in order from an object, a first lens group G1 having positive refractive power, a second lens group G2 having negative refractive power, an aperture stop S, and a third lens group G3 having positive refractive power. The first lens group G1 is composed of, in order from the object, a cemented positive lens constructed by a negative meniscus lens L11 cemented with a positive meniscus lens L12, and a double convex positive lens L13. The second lens group G2 is composed of, in order from the object, a cemented negative lens constructed by a positive meniscus lens having a strong convex surface facing the image cemented with a double concave negative lens, and a negative meniscus lens having a stronger concave surface facing the object. The third lens group G3 is composed of, in order from the object, a cemented positive lens constructed by a double convex positive lens cemented with a negative meniscus lens, a positive meniscus lens, a cemented positive lens disposed with an air space and constructed by a negative meniscus lens cemented with a double convex positive lens, and a negative meniscus lens.

When a state of lens group positions varies from a wide-angle end state (W) to a telephoto end state (T), the first lens group G1 and the third lens group G3 are moved to the object, and the second lens group G2 is moved at first to the image plane I and then to the object such that a distance between the first lens group G1 and the second lens group G2 increases, and a distance between the second lens group G2 and the third lens group G3 decreases. The aperture stop S is moved together with the third lens group G3.

Focusing from infinity to a close object is carried out by moving the first lens group G1 to the object.

Various values associated with Example 1 are listed in Table 1. In [Specifications], f denotes the focal length, FNO denotes the f-number, and 2ω denotes an angle of view (unit: degree). In [Lens Data], the left most column shows the lens surface number counted in order from the object side, the second column "r" shows a radius of curvature of the lens surface, the third column "d" shows a distance to the next lens surface, the fourth column "vd" shows Abbe number of the medium at d-line (λ=587.6 nm), and the fifth column "nd" shows refractive index of the medium at d-line. Refractive index of the air nd=1.0000 is omitted. Here, "r=∞" denotes a plane surface. In [Variable Distances], f denotes the focal length, Bf denotes a back focal length, T.L. denotes a distance between the most object side lens surface and the image plane I. In [Values for Conditional Expressions], respective values are shown.

In the tables for various values, "mm" is generally used for the unit of length such as the focal length, the radius of curvature and the distance to the next lens surface. However, since an optical system proportionally enlarged or reduced its dimension can be obtained similar optical performance, the unit is not necessary to be limited to "mm", and any other suitable unit can be used.

The explanation of reference symbols is the same in the other Examples.

TABLE 1

| [Specifications] | | |
|---|---|---|
| | W | T |
| f = | 52.43 | 194.00 |
| FNO = | 4.40 | 6.07 |
| 2ω = | 32.7 | 8.66° |

| [Lens Data] | | | |
|---|---|---|---|
| r | d | vd | nd |

| | r | d | vd | nd |
|---|---|---|---|---|
| 1) | 111.02 | 1.0 | 37.2 | 1.8340 |
| 2) | 49.68 | 4.3 | 81.6 | 1.4970 |
| 3) | 5398.88 | 0.1 | | |
| 4) | 65.08 | 4.1 | 70.2 | 1.4875 |
| 5) | −207.98 | (d5) | | |
| 6) | −273.31 | 2.9 | 27.5 | 1.7552 |
| 7) | −25.11 | 1.0 | 60.3 | 1.6204 |
| 8) | 40.08 | 2.7 | | |
| 9) | −26.53 | 1.0 | 56.2 | 1.6510 |
| 10) | −1937.26 | (d10) | | |
| 11> | ∞ | 1.5 | Aperture Stop S | |
| 12) | 54.70 | 4.7 | 64.2 | 1.5163 |
| 13) | −20.93 | 1.0 | 27.5 | 1.7552 |
| 14) | −54.03 | 0.1 | | |
| 15) | 23.26 | 3.9 | 70.2 | 1.4875 |
| 16) | 1935.87 | 20.8 | | |
| 17) | 52.21 | 1.0 | 56.2 | 1.6510 |
| 18) | 13.64 | 3.7 | 40.8 | 1.5814 |
| 19) | −92.49 | 1.6 | | |
| 20) | −16.20 | 1.5 | 44.8 | 1.7440 |
| 21) | −41.82 | (Bf) | | |

| [Variable Distances] | | |
|---|---|---|
| | W | M | T |
| f | 52.43 | 134.90 | 194.00 |
| d5 | 1.5 | 32.1 | 37.4 |
| d10 | 24.2 | 7.7 | 0.1 |
| Bf | 40.7 | 52.5 | 62.5 |
| T.L. | 123.5 | 149.3 | 157.0 |

TABLE 1-continued

[Values for Conditional Expressions]

(1): f1/fw = 1.84
(2): |X2/X1| = 0.07
(3): Z/TL = 0.03
(4): |X3/Z| = 5.88
(5): (v2 + v3)/2 = 75.89

Figure 2B:
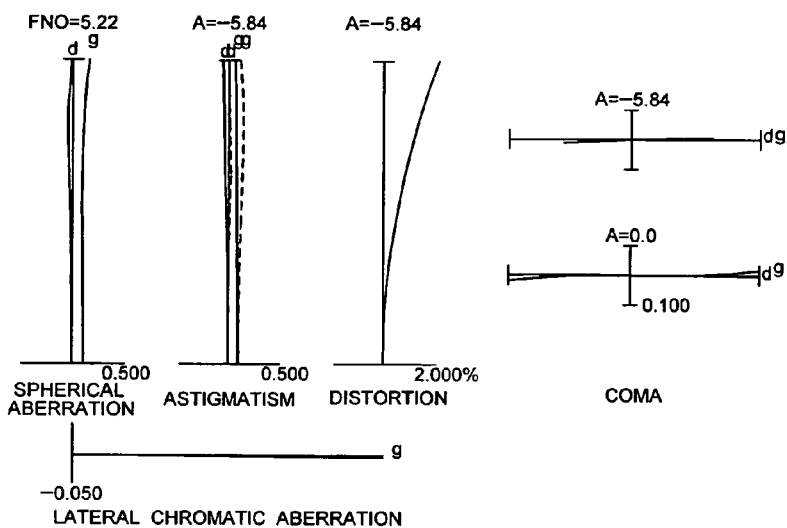
Figure 2C:
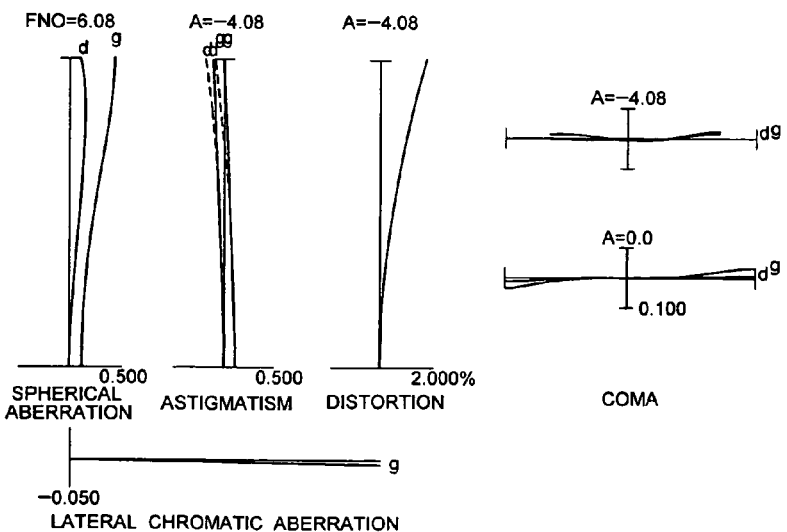

FIGS. 2A, 2B and 2C are graphs showing various aberrations of the zoom lens system according to Example 1 in which FIG. 2A shows various aberrations in a wide-angle end state, FIG. 2B shows various aberrations in an intermediate focal length state, and FIG. 2C shows various aberrations in a telephoto end state.

In respective graphs, FNO denotes an f-number, A denotes a half angle of view, d denotes aberration curve at d-line (587.6 nm), and g denotes aberration curve at g-line ($\lambda$=435.8 nm). In the graph showing astigmatism, a solid line indicates a sagittal image plane, and a broken line indicates a meridional image plane. The above-described explanation regarding various aberration graphs is the same as the other examples, and the duplicated explanations are omitted.

As is apparent from the respective graphs, the zoom lens system according to Example 1 shows superb optical performance as a result of good corrections to various aberrations in each focal length state from the wide-angle end state to the telephoto end state.

EXAMPLE 2

FIG. 3 is a diagram showing a lens configuration of a zoom lens system according to Example 2 of the present invention.

In FIG. 3, the zoom lens system according to Example 2 of the present invention is composed of, in order from an object, a first lens group G1 having positive refractive power, a second lens group G2 having negative refractive power, an aperture stop S, and a third lens group G3 having positive refractive power. The first lens group G1 is composed of, in order from the object, a cemented positive lens constructed by a negative meniscus lens L11 cemented with a positive meniscus lens L12, and a double convex positive lens L13. The second lens group G2 is composed of, in order from the object, a double concave negative lens, and a cemented negative lens constructed by a double concave negative lens cemented with a double convex positive lens having a stronger convex surface facing the object. The third lens group G3 is composed of, in order from the object, a cemented positive lens constructed by a double convex positive lens cemented with a negative meniscus lens, a positive meniscus lens, a cemented positive lens disposed with an air space and constructed by a negative meniscus lens cemented with a double convex positive lens, and a negative meniscus lens.

When a state of lens group positions varies from a wide-angle end state (W) to a telephoto end state (T), the first lens group G1 and the third lens group G3 are moved to the object, and the second lens group G2 is moved at first to the image plane I and then to the object such that a distance between the first lens group G1 and the second lens group G2 increases, and a distance between the second lens group G2 and the third lens group G3 decreases. The aperture stop S is moved together with the third lens group G3.

Focusing from infinity to a close object is carried out by moving the first lens group G1 to the object.

Various values associated with Example 2 are listed in Table 2.

TABLE 2

[Specifications]

| | W | T |
|---|---|---|
| f = | 49.90 | 194.00 |
| FNO = | 4.3 | 6.22 |
| 2ω = | 34.5 | 8.69° |

[Lens Data]

| | r | d | vd | nd |
|---|---|---|---|---|
| 1) | 103.57 | 1.0 | 37.2 | 1.8340 |
| 2) | 48.61 | 4.3 | 81.6 | 1.4970 |
| 3) | 1418.47 | 0.1 | | |
| 4) | 65.58 | 4.0 | 70.2 | 1.4875 |
| 5) | −207.26 | (d5) | | |
| 6) | −229.99 | 1.0 | 56.2 | 1.6510 |
| 7) | 31.58 | 3.2 | | |
| 8) | −26.72 | 1.0 | 60.3 | 1.6204 |
| 9) | 34.92 | 2.9 | 27.5 | 1.7552 |
| 10) | −138.55 | (d10) | | 1.0000 |
| 11> | ∞ | 1.5 | | Aperture Stop S |
| 12) | 60.75 | 4.5 | 64.2 | 1.5163 |
| 13) | −21.28 | 1.0 | 27.5 | 1.7552 |
| 14) | −49.38 | 0.1 | | 1.0000 |
| 15) | 24.43 | 3.6 | 70.2 | 1.4875 |
| 16) | 441.10 | 24.6 | | 1.0000 |
| 17) | 51.30 | 1.0 | 56.2 | 1.6510 |
| 18) | 19.42 | 3.0 | 40.8 | 1.5814 |
| 19) | −95.28 | 1.5 | | 1.0000 |
| 20) | −17.40 | 1.5 | 44.8 | 1.7440 |
| 21) | −61.72 | (Bf) | | 1.0000 |

[Variable Distances]

| | W | M | T |
|---|---|---|---|
| f | 49.90 | 134.90 | 194.00 |
| d5 | 0.5 | 32.1 | 37.5 |
| d10 | 24.5 | 7.3 | 0.1 |
| Bf | 39.0 | 54.0 | 65.1 |
| T.L. | 123.8 | 153.1 | 162.5 |

[Values for Conditional Expressions]

(1): f1/fw = 1.92
(2): |X2/X1| = 0.04
(3): Z/TL = 0.0314
(4): |X3/Z| = 6.71
(5): (v2 + v3)/2 = 75.89

Figure 4A:
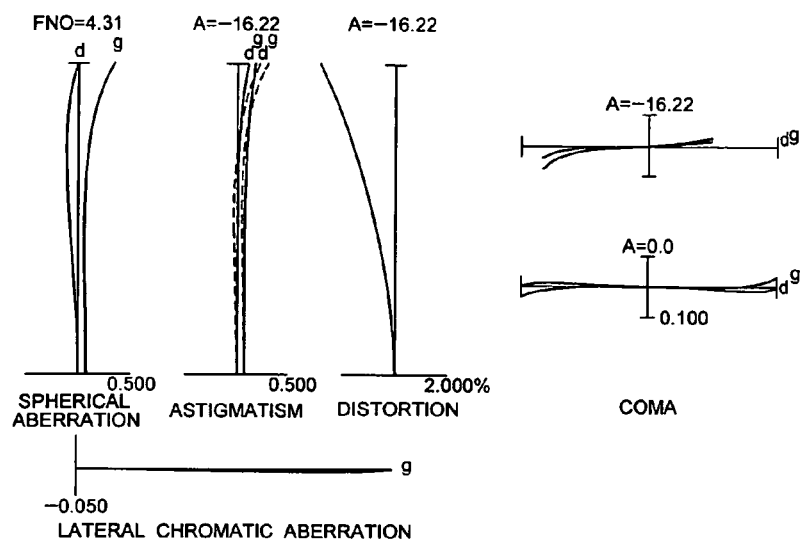
Figure 4B:
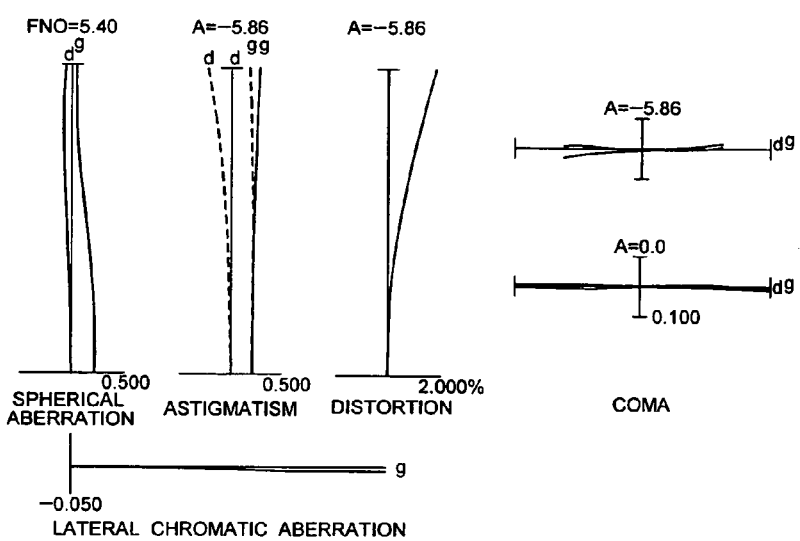
Figure 4C:
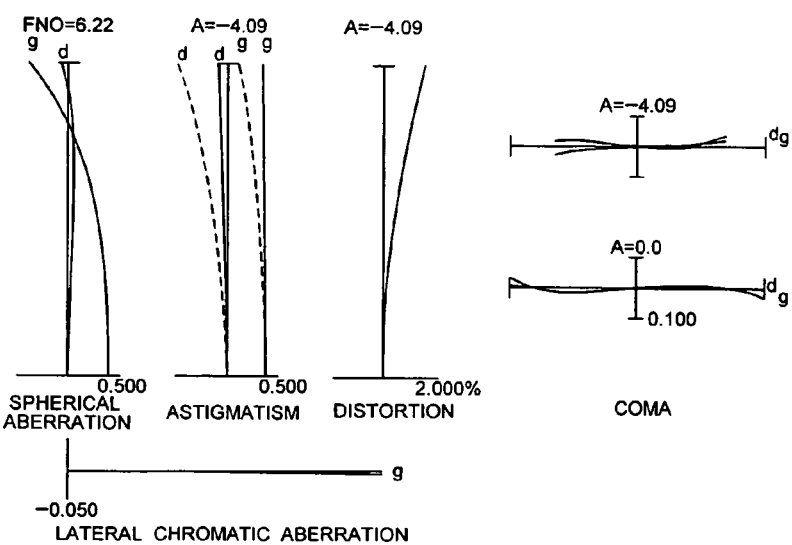

FIGS. 4A, 4B and 4C are graphs showing various aberrations of the zoom lens system according to Example 2 in which FIG. 4A shows various aberrations in a wide-angle end state, FIG. 4B shows various aberrations in an intermediate focal length state, and FIG. 4C shows various aberrations in a telephoto end state.

As is apparent from the respective graphs, the zoom lens system according to Example 2 shows superb optical performance as a result of good corrections to various aberrations in each focal length state from the wide-angle end state to the telephoto end state.

EXAMPLE 3

FIG. 5 is a diagram showing a lens configuration of a zoom lens system according to Example 3 of the present invention.

In FIG. 5, a zoom lens system according to Example 3 of the present invention is composed of, in order from an object, a first lens group G1 having positive refractive power, a second lens group G2 having negative refractive power, an aperture stop S, and a third lens group G3 having positive refractive power. The first lens group G1 is composed of, in order from the object, a cemented positive lens constructed by a negative meniscus lens L11 cemented with a positive meniscus lens L12, and a double convex positive lens L13. The second lens group G2 is composed of, in order from the object, a double concave negative lens, and a cemented negative lens constructed by a double concave negative lens cemented with a positive meniscus lens having a stronger convex surface facing the object. The third lens group G3 is composed of, in order from the object, a double convex positive lens, a cemented positive lens constructed by a double convex positive lens cemented with a double concave negative lens, a cemented positive lens disposed with an air space and constructed by a negative meniscus lens cemented with a double convex positive lens, and a negative meniscus lens.

When a state of lens group positions varies from a wide-angle end state (W) to a telephoto end state (T), the first lens group G1 and the third lens group G3 are moved to the object, and the second lens group G2 is moved at first to the image plane I and then to the object such that a distance between the first lens group G1 and the second lens group G2 increases, and a distance between the second lens group G2 and the third lens group G3 decreases. The aperture stop S is moved together with the third lens group G3.

Focusing from infinity to a close object is carried out by moving the first lens group G1 to the object.

Various values associated with Example 3 are listed in Table 3.

TABLE 3

[Specifications]

|  | W | T |
|---|---|---|
| f = | 51.24 | 194.00 |
| FNO = | 4.48 | 6.14 |
| 2ω = | 33.8 | 8.7° |

[Lens Data]

| | r | d | vd | nd |
|---|---|---|---|---|
| 1) | 98.49 | 1.0 | 37.2 | 1.8340 |
| 2) | 47.31 | 4.4 | 81.6 | 1.4970 |
| 3) | 688.58 | 0.1 | | |
| 4) | 67.55 | 4.3 | 70.2 | 1.4875 |
| 5) | −180.79 | (d5) | | |
| 6) | −2143.83 | 1.0 | 56.2 | 1.6510 |
| 7) | 52.85 | 2.6 | | |
| 8) | −32.61 | 1.0 | 60.3 | 1.6204 |
| 9) | 20.23 | 2.9 | 27.5 | 1.7552 |
| 10) | 60.22 | (d10) | | |
| 11> | ∞ | 1.5 | | Aperture Stop S |
| 12) | 90.67 | 2.8 | 70.2 | 1.4875 |
| 13) | −52.05 | 0.1 | | |
| 14) | 23.77 | 4.8 | 64.2 | 1.5163 |
| 15) | −40.47 | 1.0 | 27.5 | 1.7552 |
| 16) | 873.28 | 27.0 | | |
| 17) | 45.80 | 1.0 | 56.2 | 1.6510 |
| 18) | 20.63 | 2.9 | 40.8 | 1.5814 |
| 19) | −116.29 | 1.3 | | |
| 20) | −20.08 | 1.5 | 44.8 | 1.7440 |
| 21) | −61.40 | (Bf) | | |

TABLE 3-continued

[Variable Distances]

| | W | M | T |
|---|---|---|---|
| f | 51.24 | 134.90 | 194.00 |
| d5 | 0.1 | 32.4 | 37.4 |
| d10 | 23.7 | 7.9 | 0.9 |
| Bf | 38.5 | 51.4 | 63.0 |
| T.L. | 123.5 | 152.8 | 162.5 |

[Values for Conditional Expressions]

(1): f1/fw = 1.87
(2): |X2/X1| = 0.04
(3): Z/TL = 0.0307
(4): |X3/Z| = 6.46
(5): (ν2 + ν3)/2 = 75.89

Figure 6A:
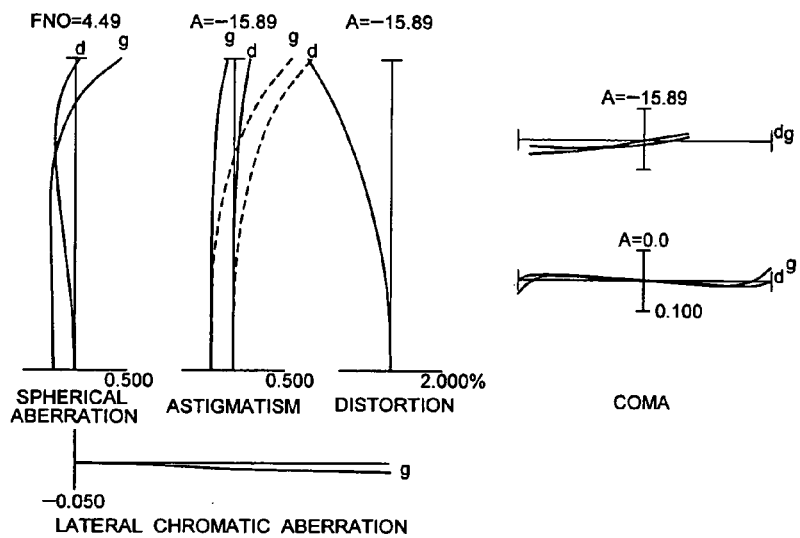
Figure 6B:
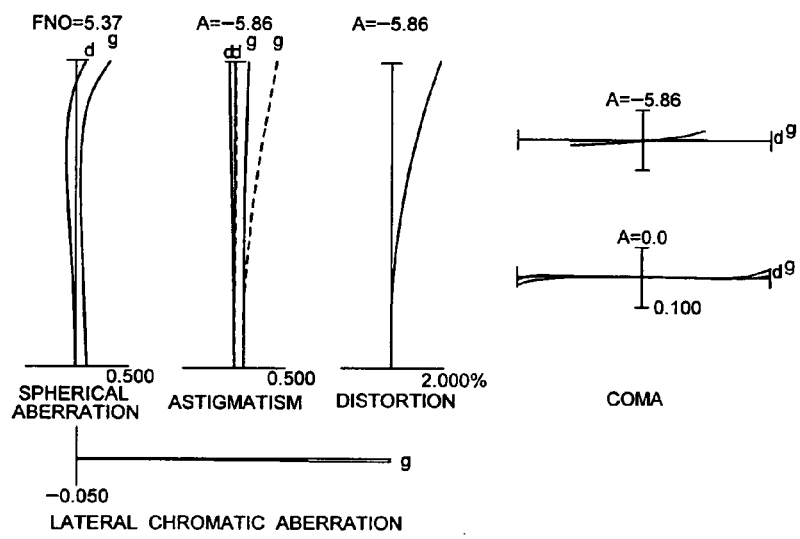
Figure 6C:
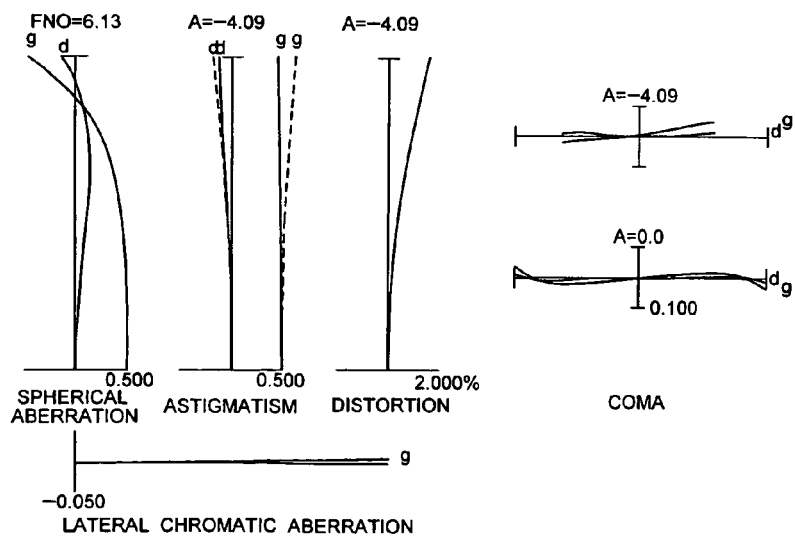

FIGS. 6A, 6B and 6C are graphs showing various aberrations of the zoom lens system according to Example 3 in which FIG. 6A shows various aberrations in a wide-angle end state, FIG. 6B shows various aberrations in an intermediate focal length state, and FIG. 6C shows various aberrations in a telephoto end state.

As is apparent from the respective graphs, the zoom lens system according to Example 3 shows superb optical performance as a result of good corrections to various aberrations in each focal length state from the wide-angle end state to the telephoto end state.

EXAMPLE 4

Figure 7:
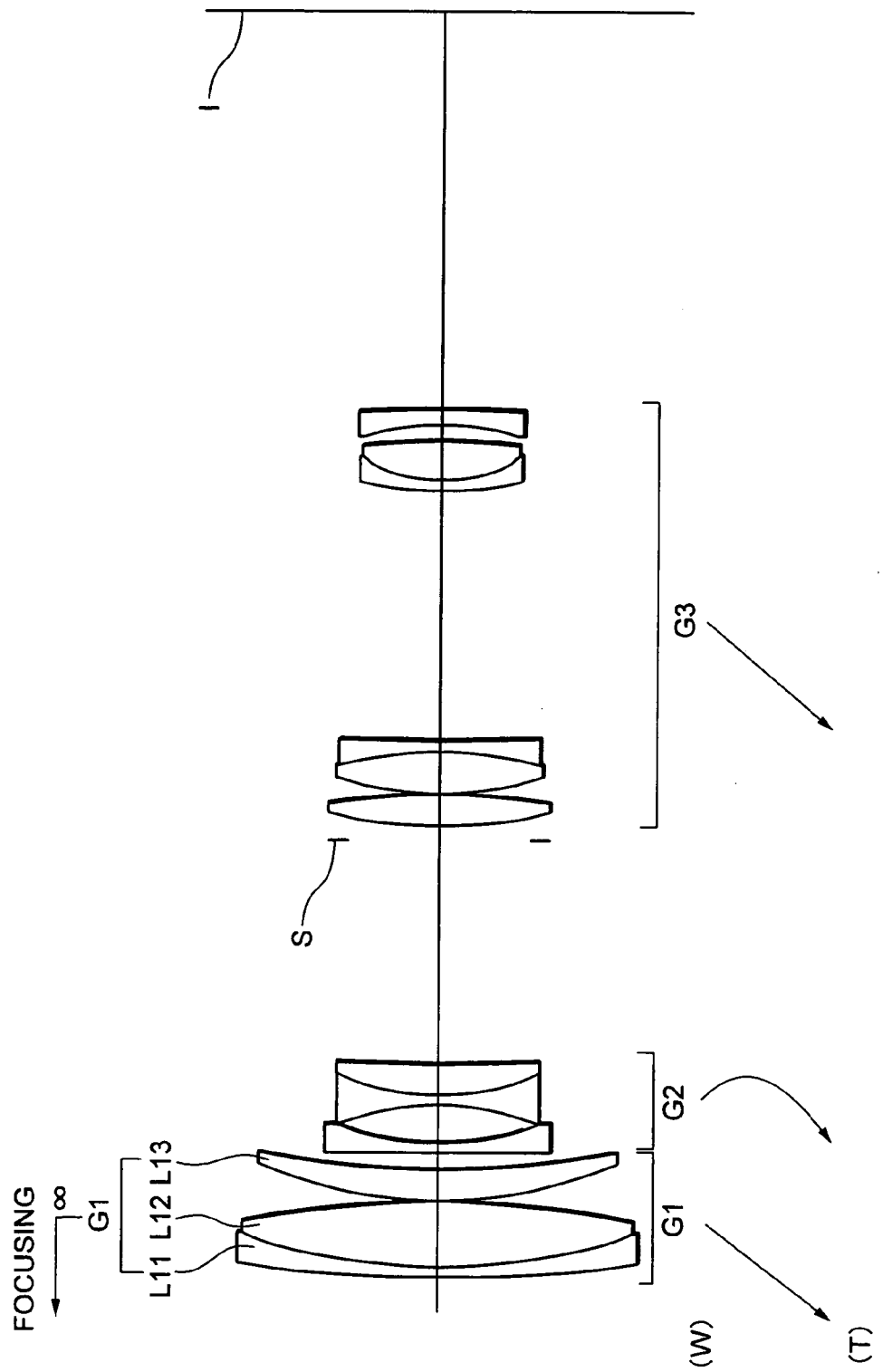
FIG. 7 is a diagram showing a lens configuration of a zoom lens system according to Example 4 of the present invention.

FIG. 7 is a diagram showing a lens configuration of a zoom lens system according to Example 4 of the present invention.

In FIG. 7, a zoom lens system according to Example 4 of the present invention is composed of, in order from an object, a first lens group G1 having positive refractive power, a second lens group G2 having negative refractive power, an aperture stop S, and a third lens group G3 having positive refractive power. The first lens group G1 is composed of, in order from the object, a cemented positive lens constructed by a negative meniscus lens L11 cemented with a double convex positive lens L12, and a positive meniscus lens L13. The second lens group G2 is composed of, in order from the object, a double concave negative lens, and a cemented negative lens constructed by a double concave negative lens cemented with a positive meniscus lens having a stronger convex surface facing the object. The third lens group G3 is composed of, in order from the object, a double convex positive lens, a cemented positive lens constructed by a double convex positive lens cemented with a double concave negative lens, a cemented positive lens disposed with an air space and constructed by a negative meniscus lens cemented with a double convex positive lens, and a negative meniscus lens.

When a state of lens group positions varies from a wide-angle end state (W) to a telephoto end state (T), the first lens group G1 and the third lens group G3 are moved to the object, and the second lens group G2 is moved at first to the image plane I and then to the object such that a distance between the first lens group G1 and the second lens group G2 increases, and a distance between the second lens group G2 and the third lens group G3 decreases. The aperture stop S is moved together with the third lens group G3.

Focusing from infinity to a close object is carried out by moving the first lens group G1 to the object.

Various values associated with Example 4 are listed in Table 4.

TABLE 4

[Specifications]

|  | W | T |
|---|---|---|
| f = | 50.18 | 193.99 |
| FNO = | 4.5 | 6.18 |
| 2ω = | 34 | 8.6° |

[Lens Data]

| | r | d | νd | nd |
|---|---|---|---|---|
| 1) | 150.40 | 1.0 | 37.2 | 1.8340 |
| 2) | 57.65 | 6.3 | 81.6 | 1.4970 |
| 3) | −88.00 | 0.1 | | |
| 4) | 46.35 | 2.9 | 70.2 | 1.4875 |
| 5) | 92.70 | (d5) | | |
| 6) | −4016.78 | 1.0 | 70.2 | 1.4875 |
| 7) | 29.09 | 3.5 | | |
| 8) | −26.18 | 1.0 | 60.3 | 1.6204 |
| 9) | 24.23 | 2.9 | 27.5 | 1.7552 |
| 10) | 149.49 | (d10) | | |
| 11> | ∞ | 1.5 | | Aperture Stop S |
| 12) | 48.83 | 3.0 | 60.3 | 1.6204 |
| 13) | −63.62 | 0.1 | | |
| 14) | 31.49 | 4.2 | 60.7 | 1.5638 |
| 15) | −35.71 | 1.0 | 27.5 | 1.7552 |
| 16) | 164.88 | 24.9 | | |
| 17) | 40.25 | 1.0 | 44.8 | 1.7440 |
| 18) | 14.07 | 3.8 | 41.5 | 1.5750 |
| 19) | −60.17 | 1.6 | | |
| 20) | −24.08 | 1.5 | 50.7 | 1.6779 |
| 21) | −164.62 | (Bf) | | |

[Variable Distances]

|  | W | M | T |
|---|---|---|---|
| f | 50.18 | 134.90 | 193.99 |
| d5 | 1.6 | 32.7 | 37.9 |
| d10 | 22.0 | 7.0 | 0.5 |
| Bf | 38.5 | 52.0 | 62.8 |
| T.L. | 123.5 | 153.1 | 162.5 |

[Values for Conditional Expressions]

(1): f1/fw = 1.85
(2): |X2/X1| = 0.07
(3): Z/TL = 0.0313
(4): |X3/Z| = 6.28
(5): (ν2 + ν3)/2 = 75.89
(6): (r2 + r1)/(r2 − r1) = 3.0

Figure 8A:
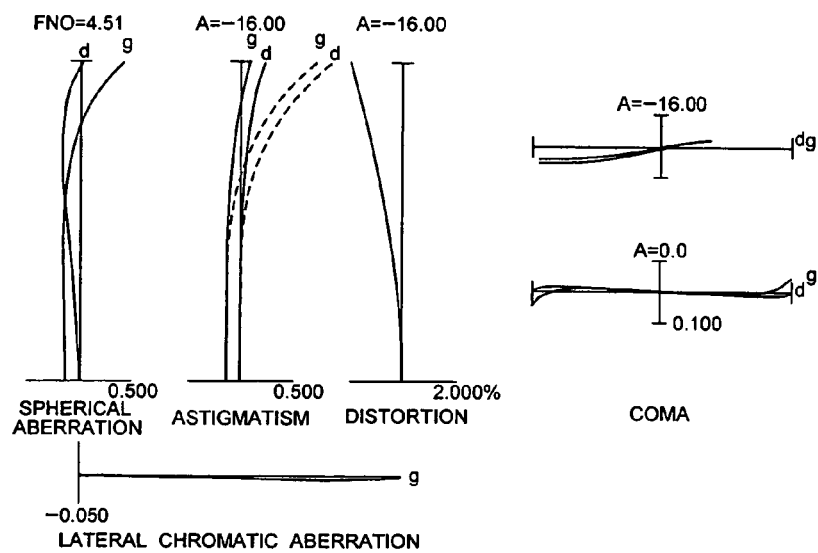
Figure 8B:
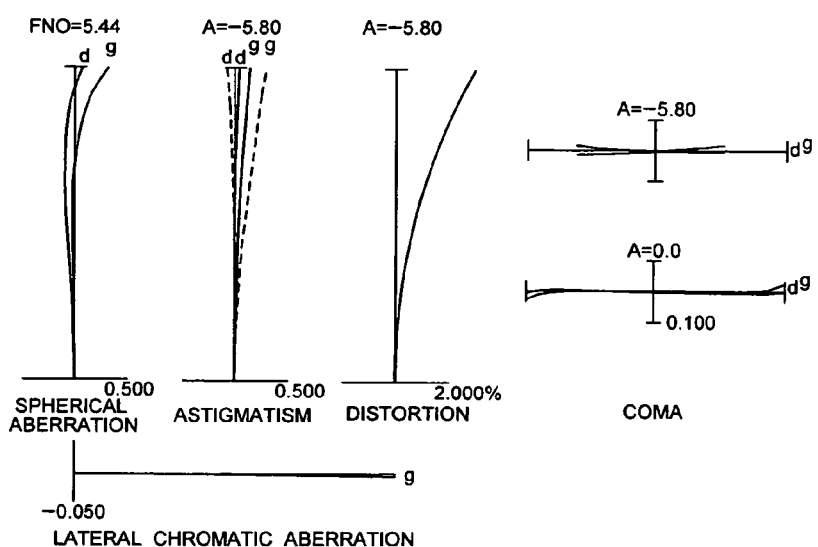
Figure 8C:
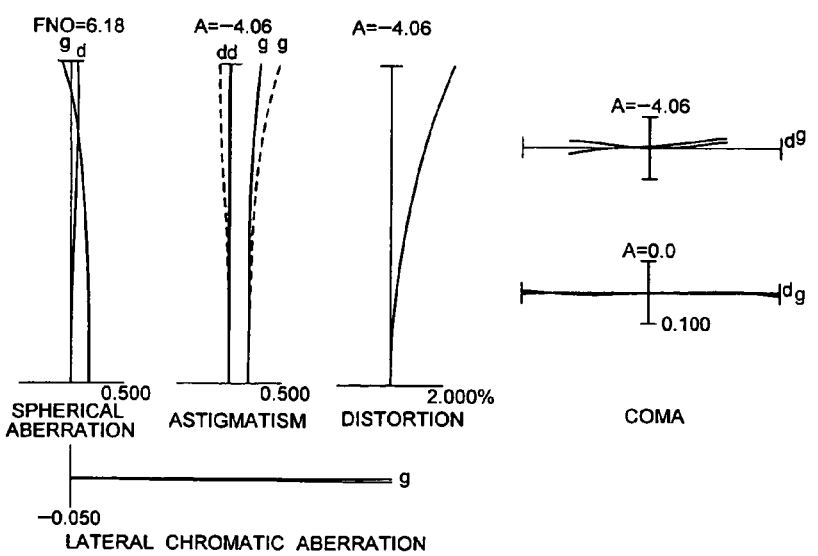

FIGS. 8A, 8B and 8C are graphs showing various aberrations of the zoom lens system according to Example 4 in which FIG. 8A shows various aberrations in a wide-angle end state, FIG. 8B shows various aberrations in an intermediate focal length state, and FIG. 8C shows various aberrations in a telephoto end state.

As is apparent from the respective graphs, the zoom lens system according to Example 4 shows superb optical performance as a result of good corrections to various aberrations in each focal length state from the wide-angle end state to the telephoto end state.

EXAMPLE 5

FIG. 9 is a diagram showing a lens configuration of a zoom lens system according to Example 5 of the present invention.

In FIG. 9, a zoom lens system according to Example 5 of the present invention is composed of, in order from an object, a first lens group G1 having positive refractive power, a second lens group G2 having negative refractive power, an aperture stop S, and a third lens group G3 having positive refractive power. The first lens group G1 is composed of, in order from the object, a cemented positive lens constructed by a negative meniscus lens L11 cemented with a double convex positive lens L12, and a positive meniscus lens L13. The second lens group G2 is composed of, in order from the object, a cemented negative lens constructed by a positive meniscus lens having a stronger convex surface facing the image cemented with a double concave negative lens, and a double concave negative lens having a stronger concave surface facing the object. The third lens group G3 is composed of, in order from the object, a double convex positive lens, a cemented negative lens constructed by a double convex positive lens cemented with a double concave negative lens, a positive meniscus lens, a cemented positive lens disposed with an air space and constructed by a negative meniscus lens cemented with a double convex positive lens, and a double concave negative lens.

When a state of lens group positions varies from a wide-angle end state (W) to a telephoto end state (T), the first lens group G1 and the third lens group G3 are moved to the object, and the second lens group G2 is moved at first to the image plane I and then to the object such that a distance between the first lens group G1 and the second lens group G2 increases, and a distance between the second lens group G2 and the third lens group G3 decreases. The aperture stop S is moved together with the third lens group G3.

Focusing from infinity to a close object is carried out by moving the first lens group G1 to the object.

Various values associated with Example 5 are listed in Table 5.

TABLE 5

[Specifications]

|  | W | T |
|---|---|---|
| f = | 56.60 | 194.00 |
| FNO = | 4.12 | 5.77 |
| 2ω = | 28.9 | 8.32° |

[Lens Data]

| | r | d | νd | nd |
|---|---|---|---|---|
| 1) | 141.00 | 1.8 | 37.2 | 1.8340 |
| 2) | 53.01 | 6.5 | 82.6 | 1.4978 |
| 3) | −86.08 | 0.1 | | |
| 4) | 42.91 | 2.7 | 64.1 | 1.5168 |
| 5) | 75.73 | (d5) | | |
| 6) | −162.22 | 3.0 | 23.8 | 1.8467 |
| 7) | −25.30 | 1.0 | 58.5 | 1.6516 |
| 8) | 42.35 | 3.0 | | |
| 9) | −26.08 | 1.0 | 49.6 | 1.7725 |
| 10) | 946.20 | (d10) | | |
| 11> | ∞ | 1.5 | | Aperture Stop S |
| 12) | 111.82 | 3.0 | 82.6 | 1.4978 |
| 13) | −53.55 | 0.1 | | |
| 14) | 38.45 | 5.7 | 65.5 | 1.6030 |

TABLE 5-continued

| | | | | |
|---|---|---|---|---|
| 15) | −25.72 | 1.3 | 33.9 | 1.8038 |
| 16) | 82.45 | 0.1 | | |
| 17) | 25.08 | 4.0 | 63.4 | 1.6180 |
| 18) | 438.55 | 16.5 | | |
| 19) | 27.83 | 1.0 | 42.7 | 1.8348 |
| 20) | 12.93 | 4.5 | 36.2 | 1.6200 |
| 21) | −42.56 | 2.5 | | |
| 22) | −18.17 | 1.0 | 47.4 | 1.7880 |
| 23) | 394.32 | (Bf) | | |

[Variable Distances]

| | W | M | T |
|---|---|---|---|
| f | 56.60 | 134.90 | 194.00 |
| d5 | 3.6 | 33.0 | 38.3 |
| d10 | 18.0 | 7.1 | 1.5 |
| Bf | 41.04 | 49.60 | 58.88 |
| T.L. | 122.9 | 150.0 | 159.0 |

[Values for Conditional Expressions]

(1): f1/fw = 1.63
(2): |X2/X1| = 0.04
(3): Z/TL = 0.0279
(4): |X3/Z| = 5.21
(5): (ν2 + ν3)/2 = 73.37
(6): (r2 + r1)/(r2 − r1) = 3.62

Figure 10A:
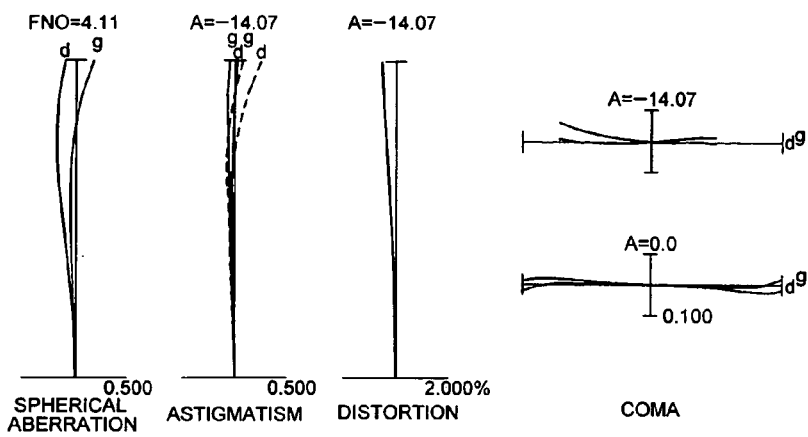
Figure 10B:
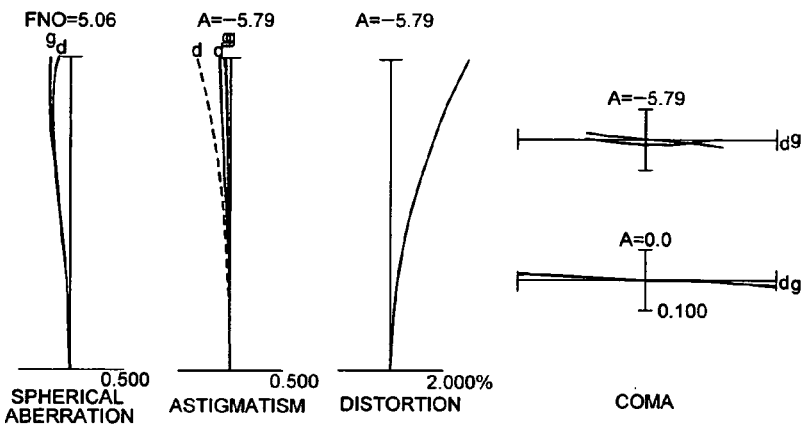
Figure 10C:
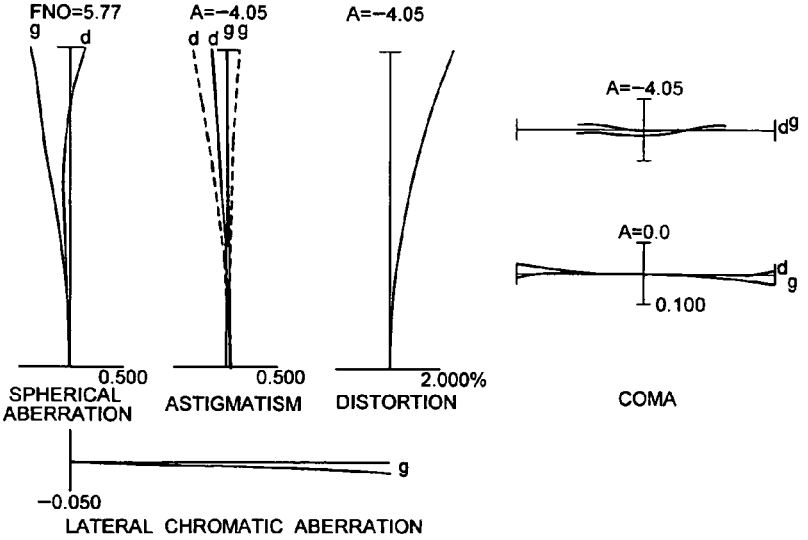

FIGS. 10A, 10B and 10C are graphs showing various aberrations of the zoom lens system according to Example 5 in which FIG. 10A shows various aberrations in a wide-angle end state, FIG. 10B shows various aberrations in an intermediate focal length state, and FIG. 10C shows various aberrations in a telephoto end state.

As is apparent from the respective graphs, the zoom lens system according to Example 5 shows superb optical performance as a result of good corrections to various aberrations in each focal length state from the wide-angle end state to the telephoto end state.

Incidentally, it is needless to say that although zoom lens systems with a three-lens-group configuration are shown as respective Examples of the present invention, a zoom lens system simply added by a lens group to the three-lens-group configuration is included in the spirit or scope of the present invention. Moreover, in the configuration of each lens group, a lens group simply added by lens elements to the lens group shown in Examples is included in the spirit or scope of the present invention.

Focusing from infinity to a close object may be carried out by moving a portion of a lens group, a lens group or a plurality of lens groups along the optical axis. The focusing lens group(s) may be used for auto focus, and suitable for being driven by a motor such as an ultrasonic motor. In particular, it is preferable that the first lens group is a focusing lens group.

A lens group or a portion of lens group may be moved perpendicularly to the optical axis to be a vibration reduction lens group which corrects an image blur caused by a camera shake. In particular, it is preferable that a portion of the third lens group is the vibration reduction lens group.

Any one of lens surface may be formed as an aspherical surface. The aspherical surface may be fabricated by a fine grinding process, a glass molding process that a glass material is formed into an aspherical shape by a mold, or a compound type process that a resin material is formed into an aspherical shape on a glass surface.

In each lens surface, an antireflection coating having high transmittance over a broad wavelength range may be applied to reduce flare or ghost images, so that high optical performance with a high contrast can be attained.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system having only three lens groups, including, in order from an object:
   a first lens group having positive refractive power;
   a second lens group having negative refractive power; and
   a third lens group having positive refractive power,
   wherein when a state of lens group positions varies from a wide-angle end state to a telephoto end state, at least the first lens group and the third lens group are moved along the optical axis toward the object, and
   the following conditional expression is satisfied:

$$1.58 < f1/fw < 2.80$$

where f1 denotes a focal length of the first lens group, and fw denotes a focal length of the zoom lens system in the wide-angle end state,
   wherein the first lens group includes, in order from the object, a cemented positive lens constructed by a negative meniscus lens cemented with a positive lens, and a single positive lens having positive refractive power.

2. The zoom lens system according to claim 1, wherein the following conditional expression is satisfied:

$$65 < (\nu 2 + \nu 3)/2 < 83$$

where ν2 denotes Abbe number of the positive lens in the cemented lens at d-line (wavelength λ=587.6 nm), and ν3 denotes Abbe number of the single positive lens at d-line (wavelength λ587.6 nm).

3. The zoom lens system according to claim 1, wherein the single positive lens having positive refractive power has a meniscus shape, and the following conditional expression is satisfied:

$$2.0 < (r2+r1)/(r2-r1) < 5.0 \quad \text{[unit: mm]}$$

where r1 denotes a radius of curvature of the object side surface of the single positive lens, and r2 denotes a radius of curvature of the image side surface of the single positive lens.

4. A method for forming an image of an object and varying a focal length, comprising the steps of:
   providing a zoom lens system that has only three lens groups, including, in order from the object, a first lens group having positive refractive power, a second lens group having negative refractive power, and a third lens group having positive refractive power; and
   varying the focal length of the zoom lens system from a wide-angle end state to a telephoto end state by moving at least the first lens group and the third lens group toward the object along the optical axis,
   wherein the following conditional expressions are satisfied:

$$1.58 < f1/fw < 2.80$$

$$0.021 < Z/TL < 0.050 \quad \text{[unit: 1/mm]}$$

where f1 denotes a focal length of the first lens group, fw denotes a focal length of the zoom lens system in the wide-angle end state, TL denotes a distance between the most object side surface of the zoom lens system in the wide-angle end state and an image plane, and Z denotes a zoom ratio.

5. A method for forming an image of an object and varying a focal length, comprising the steps of:
providing a zoom lens system that has only three lens groups, including, in order from the object, a first lens group having positive refractive power, a second lens group having negative refractive power, and a third lens group having positive refractive power; and
varying the focal length of the zoom lens system from a wide-angle end state to a telephoto end state by moving at least the first lens group and the third lens group toward the object along the optical axis,
wherein the following conditional expressions are satisfied:

$1.58 < f1/fw < 2.80$ $3.0 < |X3/Z| < 9.5$ [unit: mm]

where f1 denotes a focal length of the first lens group, fw denotes a focal length of the zoom lens system in the wide-angle end state, X3 denotes a moving amount of the third lens group upon zooming from the wide-angle end state to the telephoto end state, and Z denotes a zoom ratio.

6. A zoom lens system comprising, in order from an object:
a first lens group having positive refractive power;
a second lens group having negative refractive power; and
a third lens group having positive refractive power,
wherein when a state of lens group positions varies from a wide-angle end state to a telephoto end state, at least the first lens group and the third lens group are moved along the optical axis toward the object, and
the following conditional expressions are satisfied:

$1.58 < f1/fw < 2.80$ $0.00 < |X2/X1| < 0.15$ where f1 denotes a focal length of the first lens group, fw denotes a focal length of the zoom lens system in the wide-angle end state, X1 denotes a moving amount of the first lens group upon zooming from the wide-angle end state to the telephoto end state, and X2 denotes a moving amount of the second lens group upon zooming from the wide-angle end state to the telephoto end state.

7. The zoom lens system according to claim 6, wherein the following conditional expression is satisfied:

$0.021 < Z/TL < 0.050$ [unit: 1/mm]

where TL denotes a distance between the most object side surface of the zoom lens system in the wide-angle end state and an image plane, and Z denotes a zoom ratio.

8. The zoom lens system according to claim 6, wherein when a state of lens group positions varies from the wide-angle end state to the telephoto end state, a distance between the first lens group and the second lens group increases, and a distance between the second lens group and the third lens group decreases.

9. The zoom lens system according to claim 8, wherein the following conditional expression is satisfied:

$0.021 < Z/TL < 0.050$ [unit: 1/mm]

where TL denotes a distance between the most object side surface of the zoom lens system in the wide-angle end state and an image plane, and Z denotes a zoom ratio.

10. The zoom lens system according to claim 6, wherein focusing from infinity to a close object is carried out by moving the first lens group along the optical axis toward the object.

11. The zoom lens system according to claim 6, wherein the following conditional expression is satisfied:

$3.0 < |X3/Z| < 9.5$ [unit: mm]

where X3 denotes a moving amount of the third lens group upon zooming from the wide-angle end state to the telephoto end state, and Z denotes a zoom ratio.

12. The zoom lens system according to claim 6, wherein an aperture stop is disposed in the vicinity of or in the third lens group.

13. The zoom lens system according to claim 6, wherein every lens surface is a spherical surface.

14. A zoom lens system comprising, in order from an object:
a first lens group having positive refractive power;
a second lens group having negative refractive power; and
a third lens group having positive refractive power,
wherein when a state of lens group positions varies from a wide-angle end state to a telephoto end state, at least the first lens group and the third lens group are moved along the optical axis toward the object, and
the following conditional expressions are satisfied:

$1.58 < f1/fw < 2.80$ $0.021 < Z/TL < 0.050$ [unit: 1/mm]

where f1 denotes a focal length of the first lens group, fw denotes a focal length of the zoom lens system in the wide-angle end state, TL denotes a distance between the most object side surface of the zoom lens system in the wide-angle end state and an image plane, and Z denotes a zoom ratio.

15. A zoom lens system comprising, in order from an object:
a first lens group having positive refractive power;
a second lens group having negative refractive power; and
a third lens group having positive refractive power,
wherein when a state of lens group positions varies from a wide-angle end state to a telephoto end state, at least the first lens group and the third lens group are moved along the optical axis toward the object, and the following conditional expressions are satisfied:

$1.58 < f1/fw < 2.80$ $3.0 < |X3/Z| < 9.5$ [unit: mm]

where f1 denotes a focal length of the first lens group, fw denotes a focal length of the zoom lens system in the wide-angle end state, X3 denotes a moving amount of the third lens group upon zooming from the wide-angle end state to the telephoto end state, and Z denotes a zoom ratio.

16. A method for forming an image of an object and varying a focal length, comprising the steps of:
providing a zoom lens system that includes, in order from the object, a first lens group having positive refractive power, a second lens group having negative refractive power, and a third lens group having positive refractive power; and
varying the focal length of the zoom lens system from a wide-angle end state to a telephoto end state by moving at least the first lens group and the third lens group toward the object along the optical axis,
wherein the following conditional expressions are satisfied:

$$1.58 < f1/fw < 2.80$$

$$0.00 < |X2/X1| < 0.15$$

where f1 denotes a focal length of the first lens group, fw denotes a focal length of the zoom lens system in the wide-angle end state, X1 denotes a moving amount of the first lens group upon zooming from the wide-angle end state to the telephoto end state, and X2 denotes a moving amount of the second lens group upon zooming from the wide-angle end state to the telephoto end state.

17. The method according to claim 16,
wherein the step of varying the focal length of the zoom lens system from the wide-angle end state to the telephoto end state includes increasing a distance between the first lens group and the second lens group and decreasing a distance between the second lens group and the third lens group.

18. The method according to claim 16, further comprising the step of:
carrying out focusing from infinity to a close object by moving the first lens group toward the object along the optical axis.

* * * * *